(12) United States Patent
Kotecha et al.

(10) Patent No.: US 9,319,230 B2
(45) Date of Patent: Apr. 19, 2016

(54) PROVIDING MULTIPLE MULTICAST STREAMS OVER A SINGLE TRANSPORT BEARER CHANNEL

(71) Applicant: Verizon Patent and Licensing Inc., Arlington, VA (US)

(72) Inventors: Lalit R. Kotecha, San Ramon, CA (US); Kumar K. Vishwanathan, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 14/176,909

(22) Filed: Feb. 10, 2014

(65) Prior Publication Data
US 2015/0229486 A1    Aug. 13, 2015

(51) Int. Cl.
*H04H 20/71*    (2008.01)
*H04L 12/18*    (2006.01)
*H04W 4/06*    (2009.01)

(52) U.S. Cl.
CPC .............. *H04L 12/189* (2013.01); *H04W 4/06* (2013.01)

(58) Field of Classification Search
CPC ............................. H04L 12/189; H04W 4/06
USPC ........................... 370/312–339; 455/456, 522
See application file for complete search history.

(56) References Cited

U.S. PATENT DOCUMENTS

2008/0077710 A1\* 3/2008 Kouvelas ............ H04L 12/1854
709/250
2010/0058485 A1\* 3/2010 Gonzalez ................ G06F 21/10
726/27

OTHER PUBLICATIONS

Internet Engineering Task Force (IETF) V. Roca Inria, Request for Comments: 6726, Obsoletes: 3926, Category: Standards Track, ISSN: 2070-1721, Nov. 2012.\*
Arunabha Ghosh et al., "Designing a Broadband Wireless Network: Overview and Channel Structure of LTE," Sep. 21, 2010 (available at http://www.informit.com/articles/article.aspx?p=1627062&segNum=2, visited Jan. 21, 2014).
T. Paila et al., "Flute—File Delivery over Unidirectional Transport," Internet Engineering Task Force (IETF) Request for Comment (RFC) 6726, Nov. 2012.

\* cited by examiner

*Primary Examiner* — Iqbal Zaidi

(57) ABSTRACT

A user device may be configured to identify a received transport bearer channel, via which a group of content streams are received, the transport bearer channel including a group of logical bearer channels that each correspond to a particular transport layer session, each transport layer session corresponding to a particular one of the content streams; receive a selection of a particular content stream, of the group of content streams; identify a particular logical bearer channel, of the group of bearer channels, that corresponds to the particular content stream; extract a transport layer session from the identified particular logical bearer channel; provide, from a transport layer of the user device and to an application layer of the user device, the particular content stream from the transport layer session; and present the particular content stream.

20 Claims, 10 Drawing Sheets

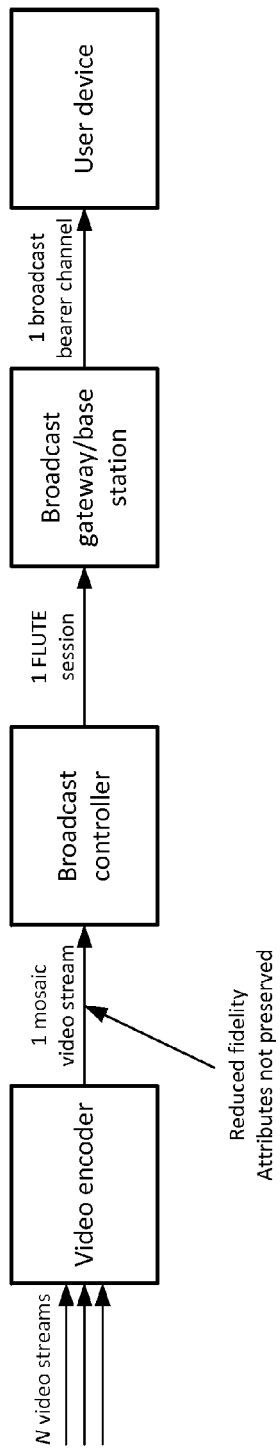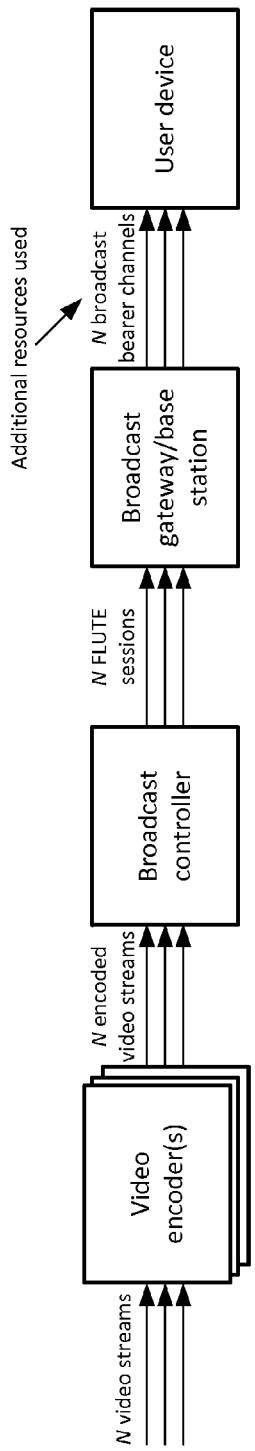
FIG. 2A
FIG. 2B

PROVIDING MULTIPLE MULTICAST STREAMS OVER A SINGLE TRANSPORT BEARER CHANNEL

BACKGROUND

Content providers may broadcast content, such as video content, to a set of devices. For example, a wireless provider may broadcast content to a set of wireless telephones using a Multimedia Broadcast Multicast Service ("MBMS") technique. In some situations, a content provider may desire to simultaneously broadcast multiple video streams, such as when broadcasting content corresponding to multiple television channels.

BRIEF DESCRIPTION OF THE DRAWINGS

FIGS. 2A and 2B illustrate examples of situations in which multiple video streams are not provided over a single transport bearer channel;

DETAILED DESCRIPTION OF PREFERRED EMBODIMENTS

The following detailed description refers to the accompanying drawings. The same reference numbers in different drawings may identify the same or similar elements.

Figure 1:
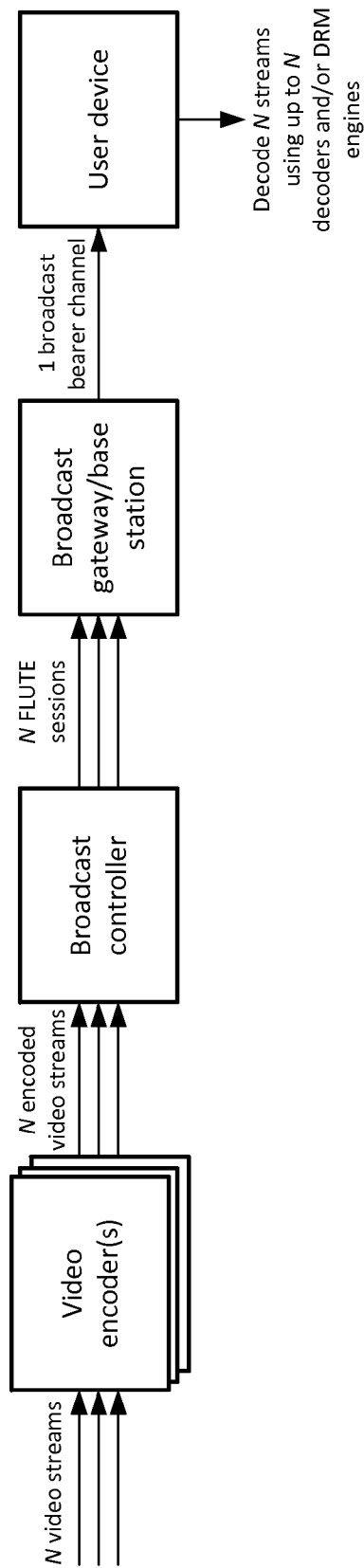
FIG. 1 illustrates an example overview of one or more implementations, in which multiple video streams are provided over a single transport bearer channel.

Techniques described herein may allow for the distribution of multiple streams of video content over a single transport bearer channel. For example, the multiple video streams may be broadcasted via a single broadcast bearer channel (e.g., an MBMS bearer channel or an evolved MBMS ("eMBMS") bearer channel). For example, as shown in FIG. 1, a set of N (where N is an integer greater than or equal to 1) video streams may be provided to a set of video encoders. The video encoders may encode the video streams (e.g., may perform a compression technique using one or more video codecs) and/or perform digital rights management ("DRM") techniques on the video streams (e.g., may encrypt the video streams), and may provide the encoded video streams to a broadcast controller.

The broadcast controller may create a set of N communications sessions, where each communication session corresponds to a particular one of the video streams. For example, the communication sessions may be communications sessions at the transport layer (e.g., layer 4) of the Open Systems Interconnect ("OCI") model. In some implementations, the transport layer communication sessions may be, or include, File Delivery over Unidirectional Transport ("FLUTE") sessions.

The broadcast controller may output the video streams, via the respective transport layer communication sessions, to one or more base stations, via a broadcast gateway. For example, the broadcast controller may output the video streams to the broadcast gateway, which may output the video streams to multiple base stations. The broadcast gateway may output the video streams (e.g., via the respective transport layer communications sessions), over a single transport bearer channel. For example, the single transport bearer channel may be an MBMS bearer channel, an eMBMS bearer channel (e.g., a Multicast Channel ("MCH")), and/or another type of transport bearer channel. As described herein, the transport bearer channel may include multiple logical bearer channels (e.g., multiple Multicast Traffic Channels ("MTCHs")), that each correspond to a particular video stream.

A user device (e.g., a mobile telephone) may "listen" for the broadcast bearer channel, and may receive the video streams (e.g., the transport layer communication sessions) over the broadcast bearer channel. The user device may extract the transport layer communication sessions from the transport bearer channel (e.g., by extracting logical bearer channels from the transport bearer channel). A transport layer of the user device may provide the video stream, from one or more of the transport layer communication sessions, to an application layer of the user device. For instance, a user of the user device may select a particular video stream, in which the user is interested in accessing. The application layer may, in turn, present the selected video stream (e.g., via a display screen of the user device).

By providing video streams via separate transport layer sessions, individual attributes of the video streams may be preserved (e.g., different audio or video codecs, bit rates, resolutions, DRM techniques, etc.). Further, by using a single transport bearer channel, resources (e.g., processing and/or network resources of the broadcast gateway, base station, and/or user device) may be conserved, compared to solutions in which multiple transport bearer channels are used.

FIGS. 2A and 2B illustrate examples in which multiple video streams are not provided via a single transport bearer. As shown in FIG. 2A, a video encoder may receive N video streams, and may generate a "mosaic" video stream based on the received video streams. For example, different portions of the mosaic video stream may correspond to different ones of the N video streams. While N video streams may be associated with different attributes (e.g., different codecs, DRM techniques, bit rates, etc.), the mosaic video stream may be a single set of attributes (e.g., one codec or set of codecs, one DRM technique, one bit rate, etc.). In this sense, the attributes of the N video streams may be lost. Further, the fidelity of the N video streams may be reduced.

As further shown, the broadcast controller may output the mosaic video stream via a single transport layer session (e.g., FLUTE session) to a broadcast gateway/base station, which may provide the mosaic video stream to a user device. In some situations, the user device may not be able to select a single video stream, from the mosaic video stream, while in other situations, the user device may be able to select a single video stream at a reduced fidelity compared to the video stream as it was originally provided to the video encoder.

As shown in FIG. 2B, a broadcast gateway may receive a set of N video streams via N corresponding transport layer sessions (e.g., FLUTE sessions). The broadcast gateway may output (via one or more base stations) the N video streams over N broadcast transport bearer channels. In this situation, additional resources (e.g., network and/or processing resources) may be expended in broadcasting the video streams via multiple broadcast transport bearer channels, when compared with the example shown in FIG. 1.

The term "transport bearer channel" (or "transport channel"), as used herein, may refer to a channel that may be used to specify how, and with what characteristics, data is transferred over a radio interface (e.g., a channel coding scheme, a module scheme, antenna mapping, and/or other characteristics). In some situations, transport bearer channels may be mapped one-to-one with physical channels, while in other situations, transport bearer channels may not be mapped one-to-one with physical channels. In some implementations, "transport bearer channel" may refer to an LTE transport bearer channel, such as an MCH.

The term "logical bearer channel" (or "logical channel"), as used herein, may refer to a channel that is used for the transfer of information (e.g., a traffic channel that is used for the transfer of information to user devices). According to some implementations, logical bearer channels may be mapped many-to-one (e.g., two or more-to-one) to transport bearer channels. For instance, a single transport bearer channel may be used to provide multiple logical bearer channels. In some implementations, "logical bearer channel" may refer to an LTE logical bearer channel, such as an MTCH.

Figure 3:
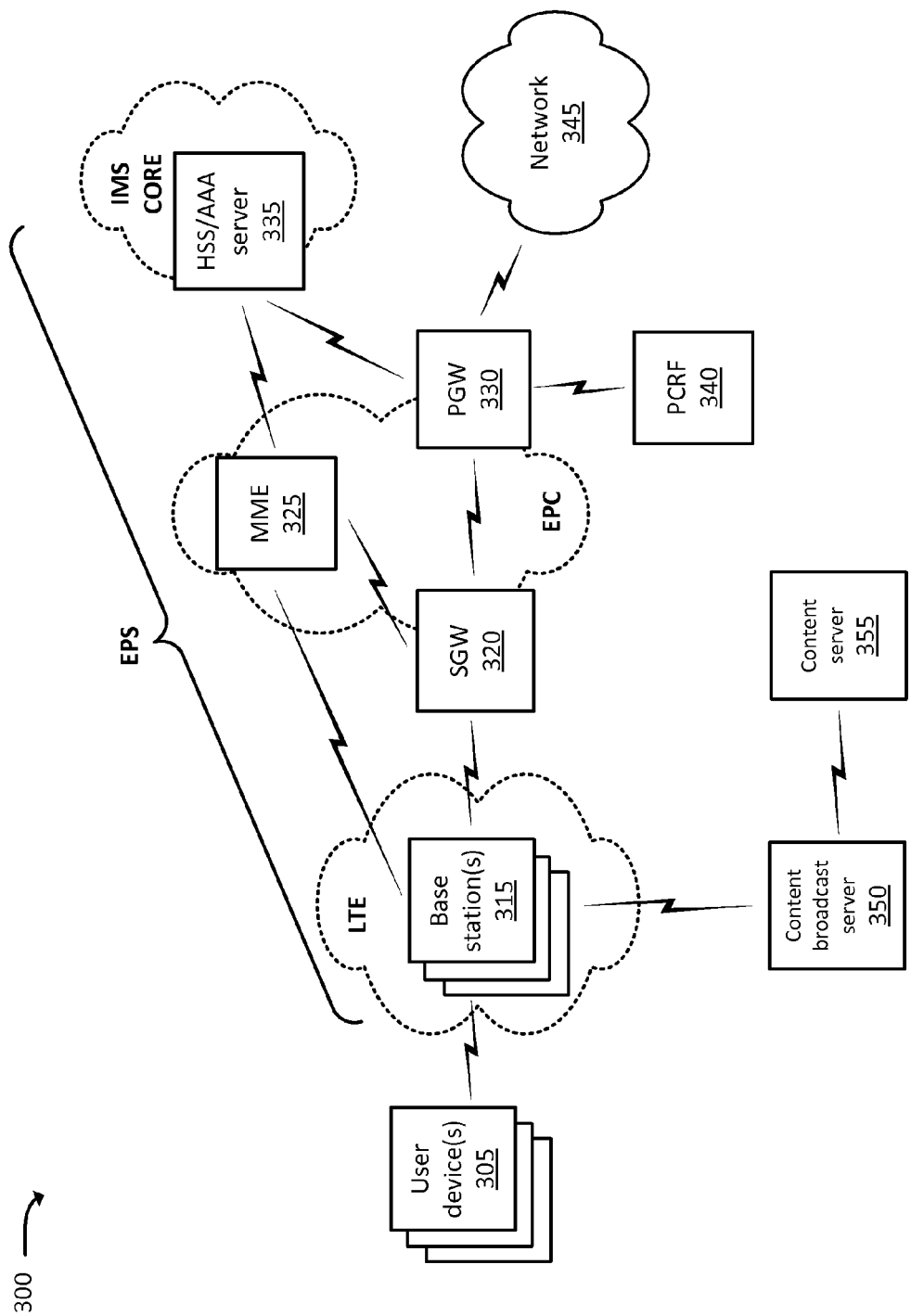
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include one or more user devices 305, one or more base stations 315, serving gateway ("SGW") 320, mobility management entity device ("MME") 325, packet data network ("PDN") gateway ("PGW") 330, home subscriber server ("HSS")/authentication, authorization, accounting ("AAA") server (hereinafter referred to as "HSS/AAA server") 335, policy charging and rules function ("PCRF") 340, network 345, content broadcast server 350, and content server 355.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections. The connections shown in FIG. 3 are example connections; in some implementations, devices in environment 300 may communicate with other devices in environment 300 even where a connection is not shown in FIG. 3.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 315, some or all of which may take the form of an eNodeB ("eNB"), via which user device 305 may communicate with the EPC network. The EPC network may include one or more SGWs 320, MMEs 325, and/or PGWs 330, and may enable user device 305 to communicate with network 345 and/or an Internet protocol ("IP") multimedia subsystem ("IMS") core network. The IMS core network may include HSS/AAA server 335, and may manage authentication, session initiation, account information, a user profile, etc. associated with user device 305.

User device 305 may include any computation and communication device, such as a wireless mobile communication device that is capable of communicating with one or more networks (e.g., network 345 and/or the IMS core). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD," sometimes known as a "set-top box" ("STB")), a personal gaming system, and/or another type of mobile computation and communication device.

Base station 315 may include one or more network devices that receive, process, and/or transmit traffic, such as calls, audio, video, text, television programming content, and/or other data, destined for and/or received from user device 305. In one example, base station 315 may be an eNB device and may be part of the LTE network. Base station 315 may receive traffic from and/or send traffic to network 345 via SGW 320 and PGW 330. Base station 315 may send traffic to and/or receive traffic from user device 305 via an air interface.

SGW 320 may include one or more network devices that gather, process, search, store, and/or provide information. For example, SGW 320 may include a gateway, a router, a modem, a switch, a firewall, a network interface card ("NIC"), a hub, a bridge, a proxy server, or some other type of device that processes and/or transfers traffic. SGW 320 may, for example, aggregate traffic received from one or more base stations 315 and may send the aggregated traffic to network 345 and/or another network via PGW 330. SGW 320 may also aggregate traffic received from network 345 and/or another network (e.g., via PGW 330) and may send the aggregated traffic to user devices 305 via one or more base stations 315.

MME 325 may include one or more computation and communication devices that gather, process, search, store, and/or provide information. For example, MME 325 may perform operations to register user device 305 with the EPS, to establish bearer channels associated with a session with user device 305, to hand off user device 305 from the EPS to another network, to hand off user device 305 from the other network to the EPS, and/or to perform other operations. MME 325 may perform policing operations on traffic destined for and/or received from user device 305.

PGW 330 may include one or more network devices, or other types of computation and communication devices, that gather, process, search, store, and/or provide information in a manner described herein. For example, PGW 330 may include a gateway, a router, a modem, a switch, a firewall, a NIC, a hub, a bridge, a proxy server, an optical add-drop multiplexer ("OADM"), and/or some other type of device that processes and/or transfers traffic. PGW 330 may aggregate traffic received from one or more SGWs 320, and may send the aggregated traffic to network 345. PGW 330 may also, or alternatively, receive traffic from network 345 and may send the traffic toward user device 305 via SGW 320, and/or base station 315.

HSS/AAA server 335 may include one or more server devices, or other types of devices, that gather, process, search, store, and/or provide information. For example, HSS/AAA server 335 may manage, update, and/or store, in a memory associated with HSS/AAA server 335, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 305 and/or one or more other user devices 305. Additionally, or alternatively, HSS/AAA server 335 may perform authentication, authorization, and/or accounting operations associated with the subscriber and/or a communication session with user device 305.

PCRF 340 may include one or more server devices, or other types of devices, that aggregate information to and from the EPC network and/or other sources. PCRF 340 may receive information regarding policies and/or subscriptions from one or more sources, such as subscriber databases and/or from one or more users (such as, for example, an administrator associated with PCRF 340).

Network 345 may include one or more wired and/or wireless networks. For example, network 345 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 345 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, some or all of network 345 may be provided by one or more cellular network providers. That is, in some such implementations, network devices within, or associated with, network 345, may be provided by the one or more cellular network providers. In some implementations, network 345 may be communicatively coupled to one or more other networks, such as the Internet.

Content broadcast server 350 may include one or more server devices, which may facilitate in the broadcasting of content to multiple user devices 305. In some implementations, content broadcast server 350 may broadcast programming content, provided by content server 355, via one or more base stations 315. A more detailed example of content broadcast server 350, in accordance with some implementations, is described below with respect to FIG. 4. In some implementations, content broadcast server 350 may implement an MBMS standard, an eMBMS standard, a Cell Broadcast Service ("CBS") standard (e.g., as standardized by the 3GPP), and/or another methodology of broadcasting messages or other content. As described herein, content broadcast server 350 may facilitate the providing of multiple content streams (e.g., video streams) via a single transport bearer channel (e.g., a single MBMS channel or a single eMBMS channel).

Content server 355 may provide content, such as programming content, to content broadcast server 350 for broadcast to user device 305. Content server 355 may be associated with a content provider, such as a television company, an on-demand movie company, and/or another distributor of content. The content may be, for example, programming content, such as television content, movie content, music content, and/or other types of content. The content may be encoded according to one or more codecs and/or encrypted according to one or more DRM techniques. In some implementations, content server 355 may include a set of encoders that encode the content according to the one or more codecs and/or encrypted the content according to the one or more DRM techniques. In some implementations, content server 355 may implement a Broadcast Video Provisioning Service ("BVPS"), which may initiate the transfer of content, including providing information regarding attributes of the content.

Figure 4:
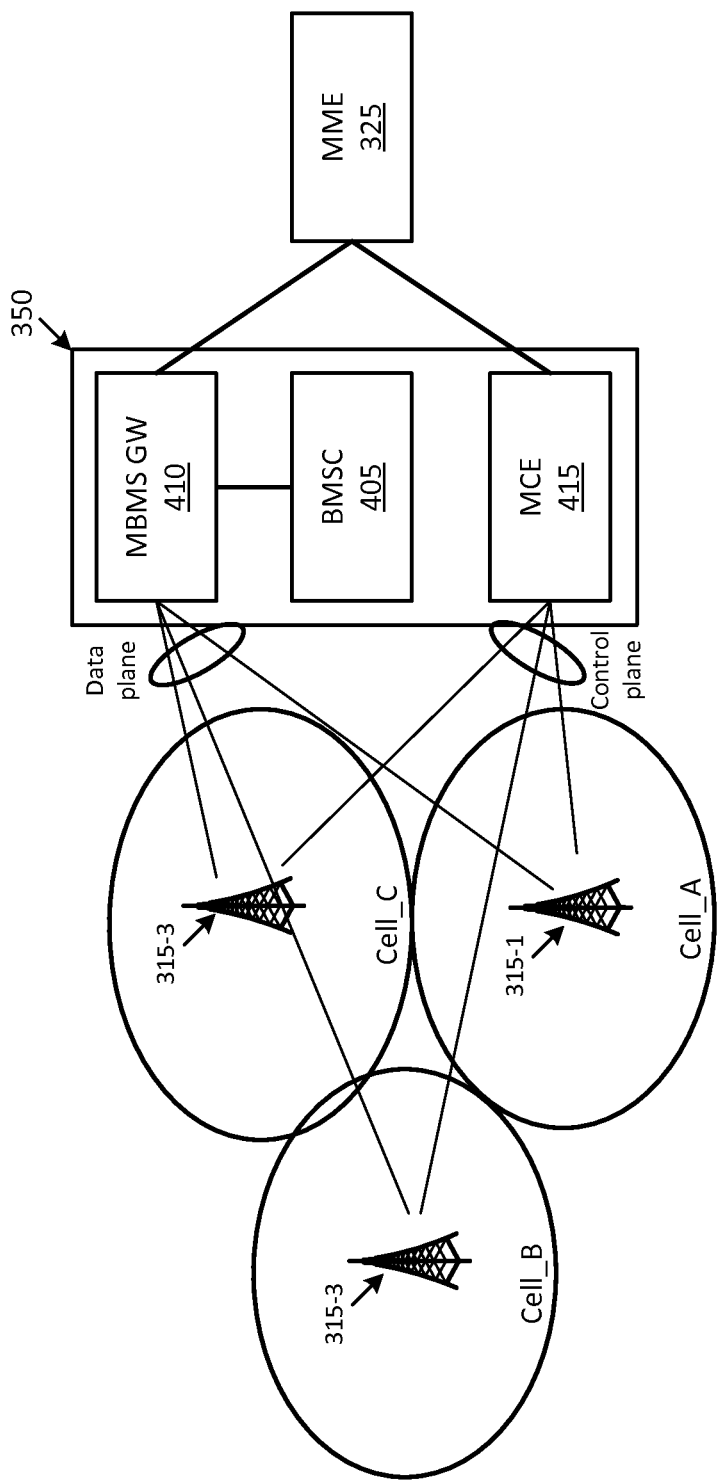
FIG. 4 illustrates an alternate view of some components of an environment in which systems and/or methods, described herein, may be implemented.

FIG. 4 illustrates some components of environment 300 in additional detail. As shown in FIG. 4, content broadcast server 350 may include Broadcast Multicast Service Center ("BMSC") 405, MBMS Gateway ("MBMS GW") 410, and Multi-cell/multicast Coordination Entity ("MCE") 415. In the example shown in FIG. 4, content broadcast server 350 may be in communication with base stations 315-1 through 315-3, each of which may be associated with a respective coverage area, or "cell" (shown in the figure as "Cell_A," "Cell_B," and "Cell_C").

BMSC 405 may include one or more computation or communication devices that provide for the coordination of broadcasting and/or multicasting using MBMS, eMBMS, CBS, and/or another broadcast technique. BMSC 405 may perform functions relating to authorization, charging, and assignment of communication channels. For example, BMSC 405 may assign a particular quantity of broadcast and/or multicast data channels for various content streams. BMSC 405 may also receive content (e.g., programming content from content server 355) for broadcast transmission, and may forward the received content as part of a broadcast or a multicast transmission.

MBMS GW 410 may include one or more computation and communication devices that provide for the coordination of the sending of broadcast and/or multicast data (e.g., IP multicast packets) to base stations 315. MBMS GW 410 may receive the content, which is to be broadcasted and/or multicasted, from BMSC 405. In some implementations, MBMS GW 410 may receive content from BMSC 405 via one or more transport layer sessions, such as one or more FLUTE sessions (e.g., as defined by Paila et al., "FLUTE—File Delivery over Unidirectional Transport," Internet Engineering Task Force ("IETF") Request for Comment ("RFC") 6726, November 2012). As illustrated, MBMS GW 410 may transmit MBMS data plane traffic to base stations 315. For instance, MBMS GW 410 may forward content, received via the transport layer sessions, over one or more broadcast transport bearer channels (e.g., one or more MBMS bearer channels and/or one or more eMBMS bearer channels).

As mentioned above, MME 325 may perform policing operations on traffic destined for and/or received from user device 305. MME 325 may, in some implementations, aid in the control signaling necessary for messages to be broadcasted and/or multicasted to user devices 305 associated with base stations 315.

MCE 415 may include one or more computation and communication devices that may perform admission control, allocation of radio resources throughout a Multimedia Broadcast Multicast Service Single Frequency Network ("MBSFN") area, MBMS session control signaling, and make decisions on radio configurations. As illustrated, MCE 415 may transmit MBMS control plane traffic to base stations 315. In some implementations, MCE 415 may be involved in the establishment of a transport bearer channel (e.g., an MCH).

In eMBMS, cells associated with base stations 315 may be grouped to obtain MBSFN areas. Broadcast and/or multicast data channels in an MBSFN area may be synchronized so that identical broadcast and/or multicast radio signals may be generated, at the same time, for multiple cells. For example, MBSFN areas may be defined that cover the area associated with multiple ones of the illustrated cells. One example MBSFN area may correspond to the area covered by Cell_A and Cell_B. A broadcast and/or multicast data channel, transmitted in the MBSFN area, may include radio signals that are synchronized in Cell_A and Cell_B.

Examples described herein are described in implementations where content is broadcasted to user devices 305. That is, base stations 315 may broadcast content, via broadcast bearers, to user devices 305. In this manner, it is possible that all user devices 305, which are in communication with base stations 315, may receive the content broadcasted from base stations 315. In alternate implementations, one or more base stations 315 may multicast content to multiple user devices 305, without necessarily broadcasting the content to all user devices 305. In multicast implementations, content broadcast server 350 may provide information to base stations 315, indicating which multicast bearers should be associated with which user devices 305.

Figure 5:
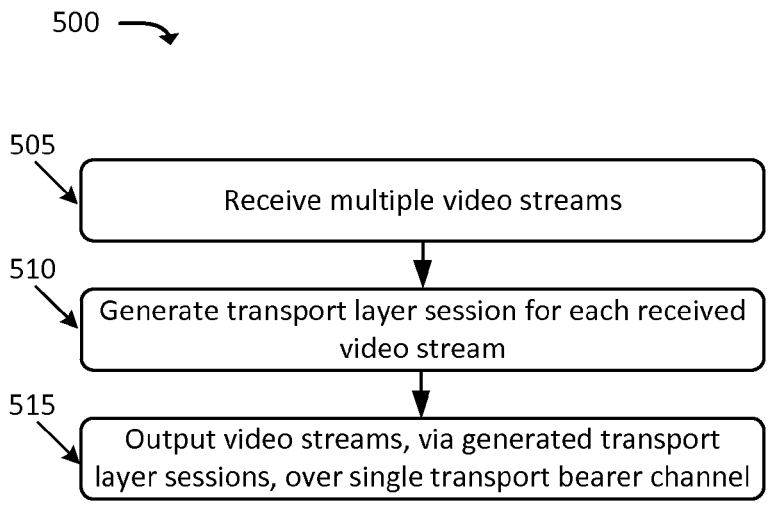
FIGS. 5 and 6 illustrate example processes for outputting multiple video streams over a transport bearer channel.

FIG. 5 illustrates an example process 500 for outputting multiple video streams via a single transport bearer channel. While FIG. 5 generally illustrates outputting multiple video streams via a single transport bearer channel, additional drawings described below provide further details, in accordance with some implementations. Process 500 may be performed by content broadcast server 350 (e.g., by BMSC 405 and/or MBMS GW 410), in one example implementation. In other implementations, process 500 may be performed by one or more other devices in lieu of, or in addition to, content broadcast server 350.

As shown, process 500 may include receiving multiple video streams (block 505). For example, BMSC 405 may receive multiple video streams from content server 355. As mentioned above, the different video streams may include different attributes, such as different codecs, different DRM techniques, different bit rates, etc.

Figure 7:
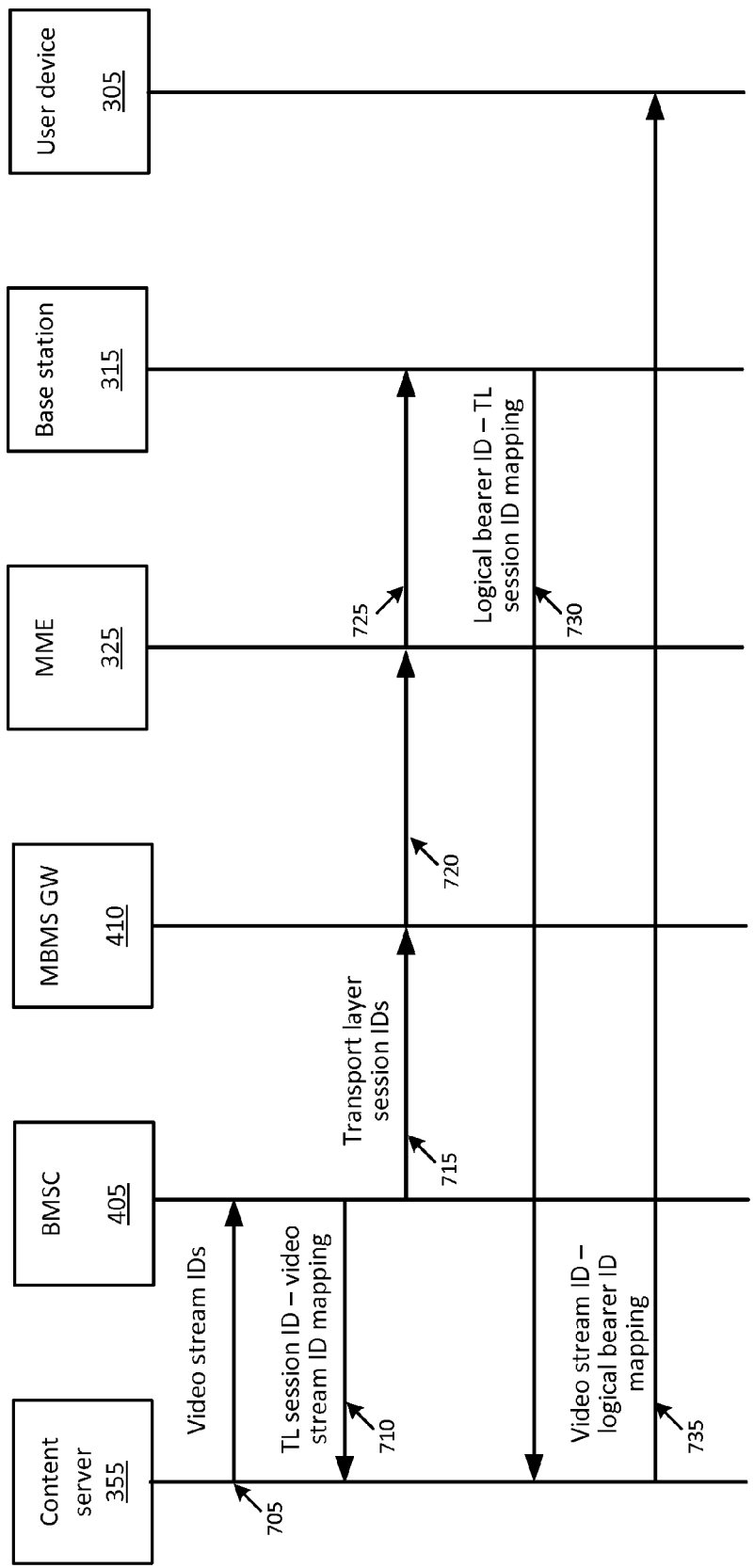
FIG. 7 illustrates example signals that may be used in a setup procedure, to facilitate the outputting of multiple video streams over a transport bearer channel.

Process 500 may also include generating a transport layer session for each received video stream (block 510). For example, BMSC 405 may initiate a transport layer session (e.g., a FLUTE session (for each video stream). In some implementations, BMSC 405 may perform block 510 before video streams are received (at block 505). For example, BMSC 405 may generate transport layer sessions before receiving video streams from content server 355. For instance, the transport layer sessions may be generated as part of a setup or a provisioning procedure, which may be initiated by content server 355 and/or another device. FIG. 7, described below, illustrates an example of such a setup procedure. In some implementations, the transport layer sessions may be used to provide the video streams to MBMS GW 410, which may facilitate the broadcasting of the video streams to a set of user devices 305.

Process 500 may further include outputting the video streams, via the generated transport layer sessions, over a single transport bearer channel (block 515). For example, MBMS GW 410 may establish a single transport bearer channel (e.g., a single MCH), and may output the video streams over the single transport bearer channel. For example, as described in greater detail with respect to FIG. 6 below, the transport bearer channel may include multiple logical bearer channels that each correspond to a particular video stream. The single transport bearer channel may be used to ultimately transport the video streams from the MBMS GW 410 to a set of user devices 305.

Figure 6:
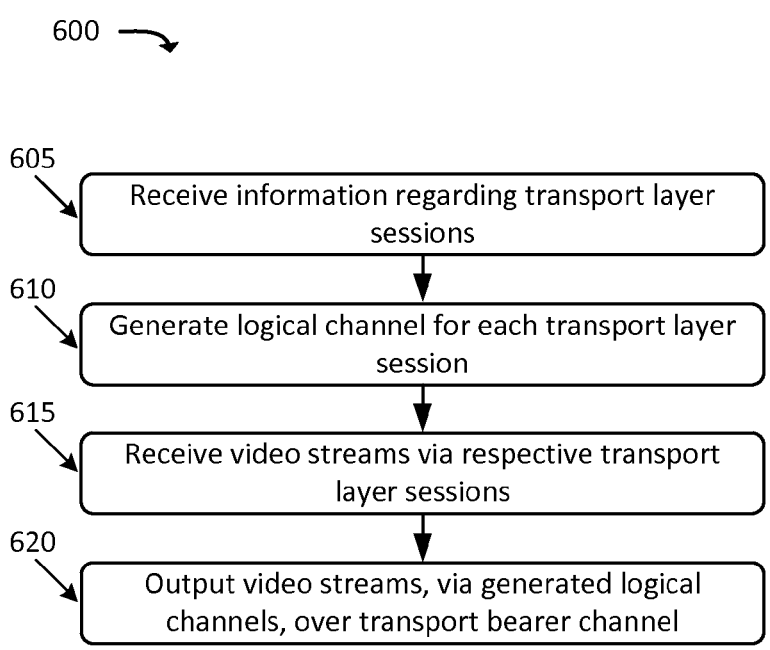

Process 600, shown in FIG. 6, may be performed by base station 315, in accordance with some implementations. In other implementations, process 600 may be performed by one or more devices in addition to, or in lieu of, base station 315.

As shown, process 600 may include receiving information regarding transport layer sessions (block 605). For example, base station 315 may receive information indicating that a number of transport layer sessions have been established (e.g., a number of FLUTE sessions have been established by MBMS GW 410). As described below, base station 315 may receive the indication from, for example, MME 325. In some implementations, base station 315 may receive the information during a provisioning or setup of the transport layer sessions.

Process 600 may also include generating a logical channel for each transport layer session (block 610). For example, base station 315 may establish an MTCH or another type of logical channel corresponding to each transport layer session. As described below, the generated logical channels may be combined (e.g., multiplexed) into a single transport channel (e.g., an MCH), in order to be provided to one or more user devices 305.

Process 600 may further include receiving video streams via respective transport layer sessions (block 615). For example, base station 315 may receive the video streams from MBMS GW 410 and/or another source. The video streams may each be received via a particular transport layer session (e.g., FLUTE session).

Process 600 may additionally include outputting the video streams, via the generated logical channels, over a transport bearer channel (block 620). For example, as mentioned above, base station 315 may output the multiple logical channels (e.g., by time-division multiplexing and/or using another technique) via a single transport channel (e.g., an MCH) to one or more user devices. In some implementations, base station 315 may receive an instruction (e.g., from content broadcast server 350) to broadcast and/or to multicast the transport channel.

As mentioned above, FIG. 7 illustrates example signals that may be used in a setup procedure, to facilitate the outputting of multiple video streams over a transport bearer channel. As shown, content server 355 may output (at 705) a set of video stream identifiers ("IDs") to BMSC 405. As described below, the video stream identifiers may be used to select a particular video stream. A video stream identifier may include a string of alphanumeric and/or non-alphanumeric characters, including a randomly generated string and/or a string specified by a user of content server 355 (e.g., an administrator and/or a content provider).

BMSC 405 may establish a set of transport layer sessions (e.g., FLUTE sessions), based on receiving the video stream identifiers from content server 355. As further shown in FIG. 7, BMSC 405 may output (at 710) a mapping of transport layer ("TL") session identifiers to video stream identifiers. Transport layer session identifiers may, for example, be any suitable type of identifier that may be used to uniquely identify a particular established transport layer session. The mapping may indicate which video stream(s) is/are associated with which transport layer session(s).

BMSC 405 may also output (at 715, 720, and 725) the transport layer identifiers to base station 315, via MBMS GW 410 and/or MME 325. Based on receiving the transport layer identifiers, base station 315 may establish a set of logical bearer channels (e.g., MTCHs). In some implementations, each logical bearer channel may correspond to a particular transport layer session. Base station 315 may output a mapping of logical bearer channel identifiers to transport layer identifiers. For instance, base station 315 may output the mapping to content server 355. While not shown in the figure, base station 315 may output the mapping to MME 325 and/or another device.

Content server 355 may use the mapping information (received at 710 and 730) to generate a video stream identifier to logical bearer identifier mapping, and may output (at 735) the mapping to user device 305. In some implementations, the mapping may be broadcasted, or otherwise provided to user device 305, as part of a service discovery channel. As described below, user device 305 may use this mapping information to select a particular received video stream (e.g., a video stream received via MBMS, eMBMS, and/or another broadcast technique). In some implementations, the mapping may additionally include a mapping to a corresponding transport layer session identifier.

Figure 8:
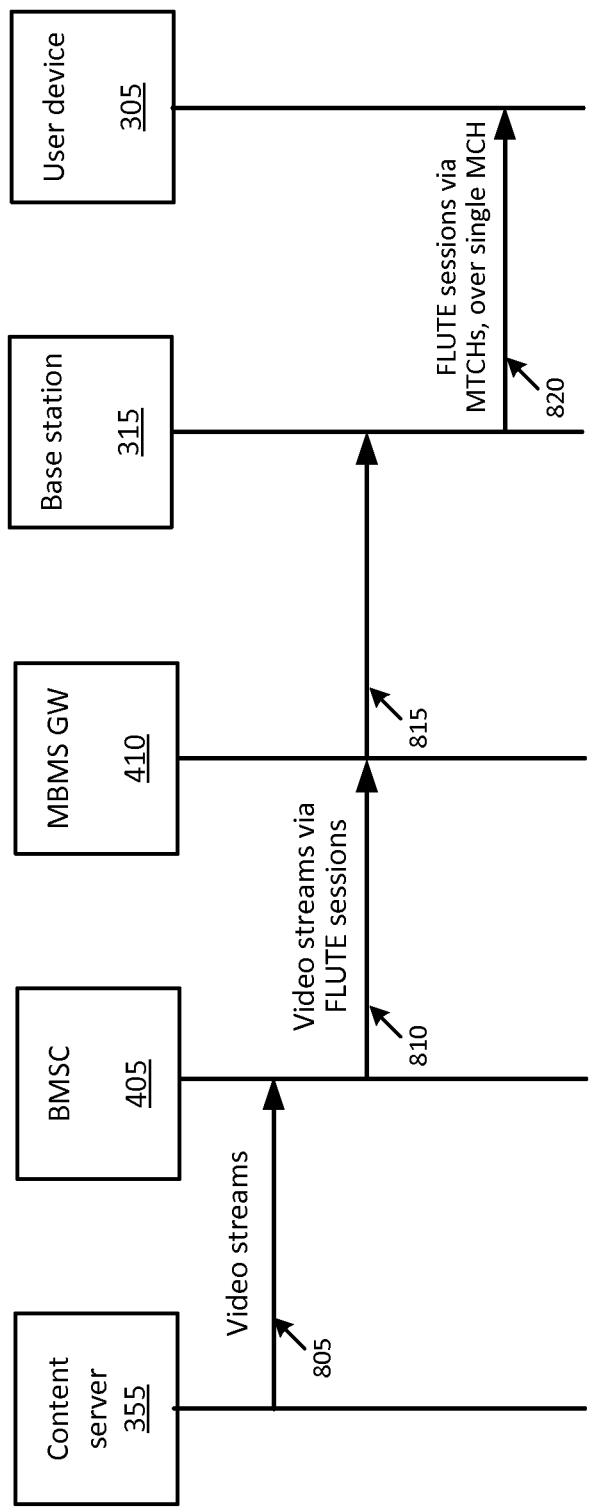
FIG. 8 illustrates example signals that may be used to output multiple video streams over a transport bearer channel.

FIG. 8 illustrates example signals that may be used to output multiple video streams over a single transport bearer channel. In some implementations, the signals shown in FIG. 8 may be transmitted after an establishment procedure (e.g., similar to the example shown in FIG. 7). As shown, content server 355 may, in some implementations, output (at 805) a set of video streams to BMSC 405. As mentioned above, the video streams may have differing characteristics (e.g., different codecs, different bit rates, different DRM techniques, etc.).

BMSC 405 may output (at 810 and 815) the video streams via a set of transport layer sessions (e.g., FLUTE sessions). For instance, BMSC 405 may output the video streams to MBMS GW 410, which may forward the video streams, along with distribution (e.g., broadcast and/or multicast) instructions to base station 315.

As described above, each transport layer session may correspond to one particular video stream. In some implementations, a single transport layer session may correspond to two or more video streams. Such a situation may occur, for example, when multiple video streams share certain characteristics (e.g., the same set of codecs, the same DRM technique, etc.). In some implementations, an administrator associated with content server 355 and/or BMSC 405 may cause multiple video streams to be placed in a single transport layer session.

Base station 315 may output the video streams (e.g., via the transport layer sessions), via a single transport bearer channel (e.g., a single MCH). In some implementations, and described in more detail with respect to FIG. 9, the transport bearer channel may include multiple logical bearer channels (e.g., MTCHs). As also described below, user device 305 may use mapping information (e.g., a mapping of logical bearer channels to video streams) to select one or more of the received video streams for presentation (e.g., display via a display device associated with user device 305, recording to a storage device associated with user device 305, etc.). The mapping information may be, for example, the mapping information received at 735, as described above with respect to FIG. 7.

Figure 9:
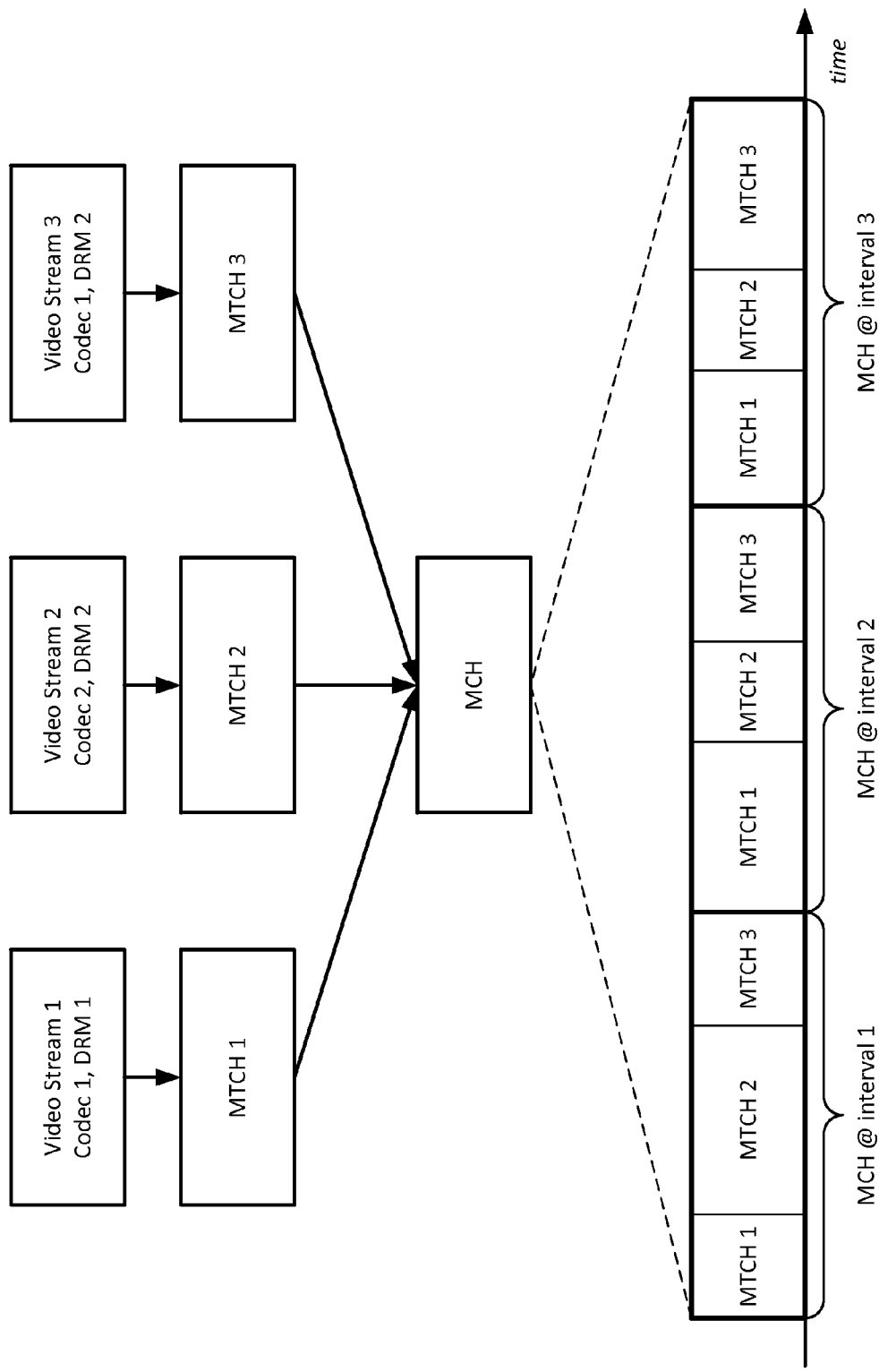
FIG. 9 conceptually illustrates an example of components of a transport bearer channel via which multiple video streams may be transmitted, in accordance with some implementations.

FIG. 9 conceptually illustrates an example of components of a transport bearer channel via which multiple video streams may be transmitted. In the example shown in FIG. 9, a set of video streams (e.g., Video Streams 1-3) may be included in a set of logical bearer channels (e.g., MTCHs 1-3). Specifically, Video Stream 1 may be associated with MTCH 1, Video Stream 2 may be associated with MTCH 2, and Video Stream 3 may be associated with MTCH 3. As also shown, the video streams may each be associated with a respective set of attributes, such as a respective codec and a respective DRM technique. For instance, Video Stream 1 may be associated with Codec 1 and DRM 1, Video Stream 2 may be associated with Codec 2 and DRM 2, and Video Stream 3 may be associated with Codec 1 and DRM 2.

In some implementations, MTCHs 1-3 may be combined in a suitable manner for transmission via the MCH. For instance, in the example shown in FIG. 9, MTCHs may be time-division multiplexed onto the MCH. That is, at a particular given time, the content of one particular MTCH may be transmitted via the MCH.

In some implementations, such as in this example, the time-division multiplexing may be performed in a variable manner. For example, in a given periodic interval, data associated with each MTCH may be transmitted via the MCH. However, during each interval, the amount of time given for each MTCH may differ from interval to interval. For example, as shown in FIG. 9, at a first interval ("MCH @ interval 1"), MTCH 2 may be given the most time out of the three MTCHs, while in the second interval ("MCH @ interval 2"), MTCH 1 may be given the most time, and in the third interval ("MCH @ interval 3"), MTCH 3 may be given the most time. More time may be allocated for a particular MCH when more data is to be transported over a particular time interval for a particular video stream. Such a situation may occur, for instance, when a particular video stream includes variable bit rate data.

Figure 10:
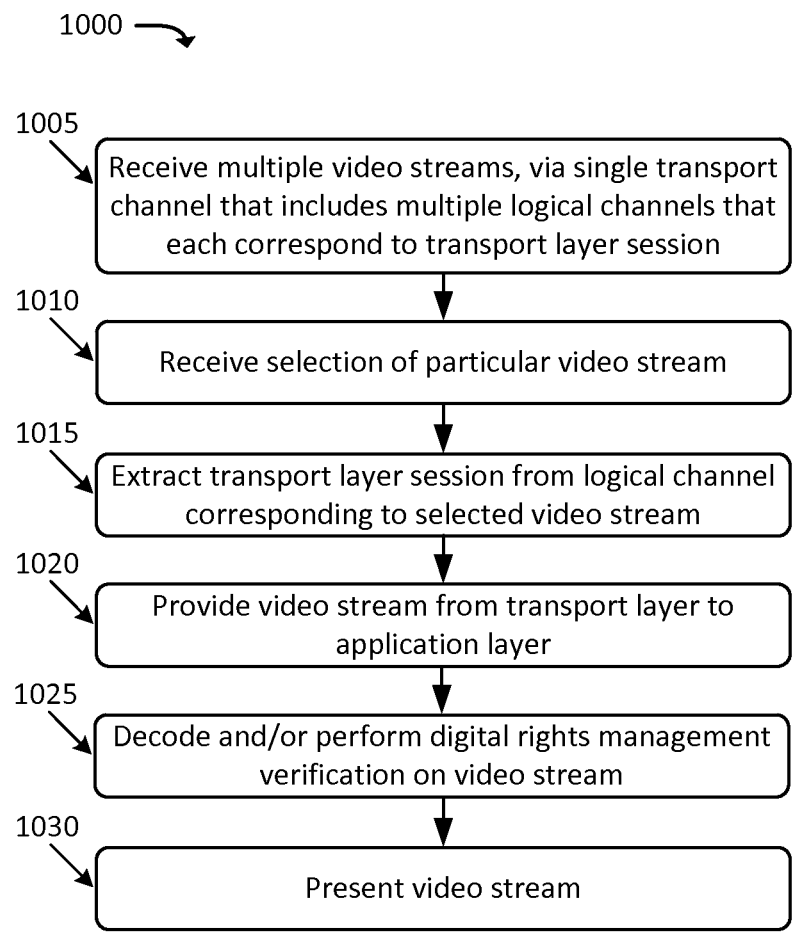
FIG. 10 illustrates an example process for presenting a selected video stream, received via a transport bearer channel that includes multiple video streams.

FIG. 10 illustrates an example process 1000 for presenting a selected video stream, received via a transport bearer channel that includes multiple video streams. In some implementations, process 1000 may be performed by user device 305. In other implementations, process 1000 may be performed by one or more devices in lieu of, or in addition to, user device 305.

As shown, process 1000 may include receiving multiple video streams, via a single transport channel that includes multiple logical channels that each correspond to a transport layer session (block 1005). For example, as described above, user device 305 may receive (e.g., via a broadcast technique) an MCH that includes multiple MTCHs. As also described above, each MTCH may correspond to a particular transport layer session (e.g., FLUTE session), and may ultimately correspond to a particular video stream.

Process 1000 may also include receiving a selection of a particular video stream (block 1010). For example, user device 305 may receive a selection, from a user, of a particular video stream that the user desires to access. As described above, user device 305 may have previously received a service discovery message, which may indicate available video streams. In some implementations, the service discovery message may also include a mapping of video streams to MTCHs.

Process 1000 may further include extracting a transport layer session from a logical channel that corresponds to the selected video stream (block 1015). For example, user device 305 may identify a logical channel (e.g., MTCH) that corresponds to the selected video stream, based on the mapping described above. User device 305 may extract the FLUTE session from the MTCH that corresponds to the selected video stream. In some implementations, user device 305 may perform a de-multiplexing operation, in order to extract the desired MTCH.

Process 1000 may additionally include providing the video stream from a transport layer to an application layer (block 1020). For example, a transport layer of user device 305 may extract the video stream from the FLUTE session, and may provide the video stream to an application layer of user device 305.

Process 1000 may also include decoding and/or performing DRM verification on the video stream (block 1025). For example, the application layer of user device 305 may include one or more decoders and/or DRM engines, which may decode and/or perform DRM verification on the video stream.

Process 1000 may further include presenting the video stream (block 1030). For example, user device 305 may output the video stream via an output device associated with user device 305 (e.g., a display device and/or an audio output device), may store the video stream (e.g., on a storage device associated with user device 305), and/or may present the video stream in another way.

Figure 11:
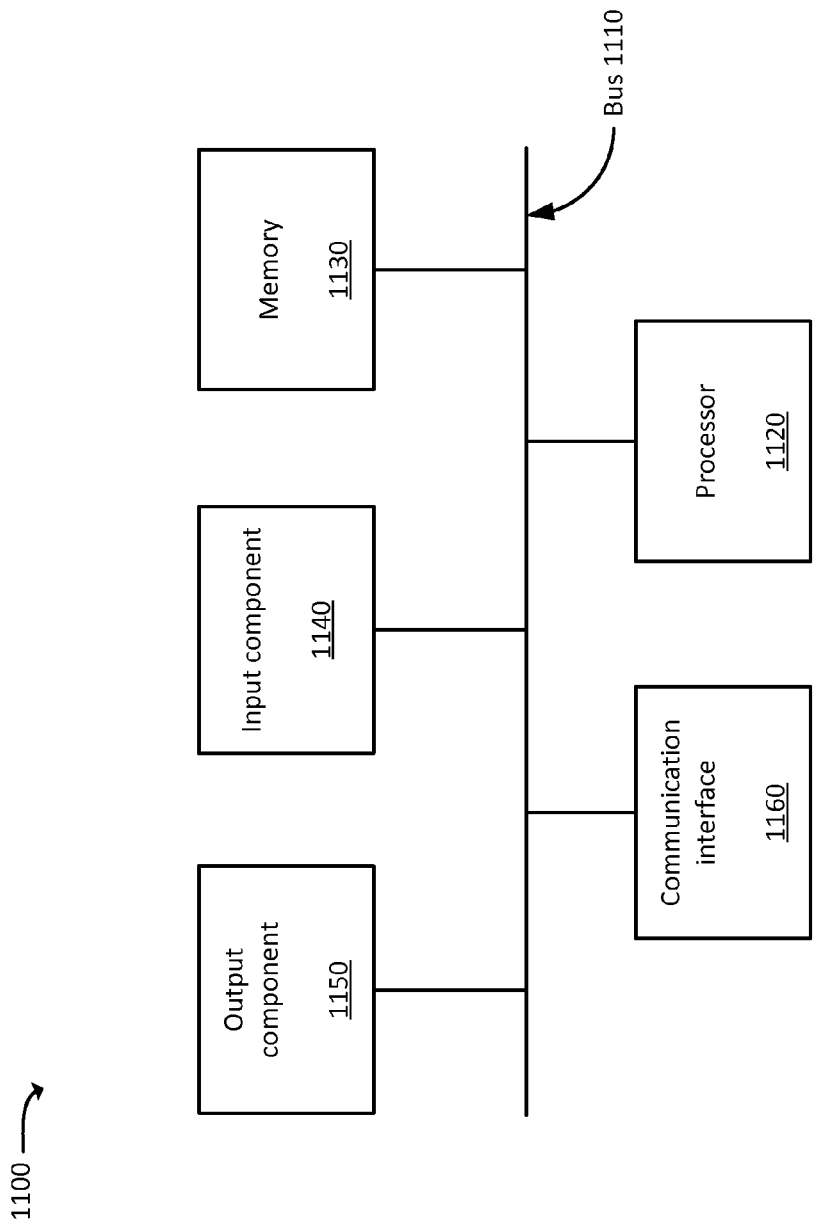
FIG. 11 illustrates example components of one or more devices, according to one or more implementations described herein.

FIG. 11 is a diagram of example components of device 1100. One or more of the devices described above (e.g., as described with respect to FIGS. 3 and 4) may include one or more devices 1100. Device 1100 may include bus 1115, processor 1115, memory 1125, input component 1135, output component 1145, and communication interface 1260. In another implementation, device 1100 may include additional, fewer, different, or differently arranged components.

Bus 1115 may include one or more communication paths that permit communication among the components of device 1100. Processor 1115 may include a processor, microprocessor, or processing logic that may interpret and execute instructions. Memory 1125 may include any type of dynamic storage device that may store information and instructions for execution by processor 1115, and/or any type of non-volatile storage device that may store information for use by processor 1115.

Input component 1135 may include a mechanism that permits an operator to input information to device 1100, such as a keyboard, a keypad, a button, a switch, etc. Output component 1145 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1100 may include more than one communication interface 1160. For instance, device 1100 may include one or more wired interfaces and one or more wireless interfaces.

Device 1100 may perform certain operations relating to one or more processes described above. Device 1100 may perform these operations in response to processor 1115 executing software instructions stored in a computer-readable medium, such as memory 1125. A computer-readable medium may be defined as a non-transitory memory device. A memory device may include space within a single physical memory device or spread across multiple physical memory devices. The software instructions may be read into memory 1125 from another computer-readable medium or from another device. The software instructions stored in memory 1125 may cause processor 1115 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5, 6 and 10, the order of the blocks may be modified in other implementations. Further, non-dependent blocks may be performed in parallel.

Additionally, while series of signals have been described with regard to FIGS. 7 and 8, the order of the signals may be modified in other implementations. Also, non-dependent signals may be sent and/or received in parallel. In some implementations, additional signals may be transmitted before, after, or in between the described signals.

While the above description was presented in the context of providing video streams, similar techniques may be used to provide any type of content (e.g., audio content, file downloads, etc.). Furthermore, the above description was presented in the context of broadcasting content. In some implementations, similar techniques may be used for programming content that is multicasted (e.g., delivered to multiple recipients without using a broadcasting technique), or delivered in another fashion.

Further, techniques similar to the ones described above may be used for the unicasting of content. For example, in some implementations, content server 355 may establish a set of transport layer sessions (e.g., FLUTE sessions) that each correspond to a particular content stream. Content server 355 may output the content streams, via the transport layer sessions, to base station 315 and/or another device that causes base station 315 to output content. Base station 315 may unicast the multiple content streams, via a single transport bearer channel, to a particular user device 305.

The actual software code or specialized control hardware used to implement a particular embodiment is not limiting of the particular embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 3 and 4), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a user device, a plurality of content streams that are associated with a plurality of different codecs, the content streams being received via a transport bearer channel, the transport bearer channel including a plurality of logical bearer channels that each correspond to a particular transport layer session, each transport layer session corresponding to a particular one of the content streams;
   receiving, by the user device, a selection of a particular content stream, of the plurality of content streams;
   receiving a mapping of content stream identifiers to logical bearer channel identifiers;
   identifying a content stream identifier associated with the selected particular content stream;
   identifying a plurality of logical bearer channel identifiers associated with the plurality of logical bearer channels;
   identifying, by the user device, a particular logical bearer channel, of the plurality of bearer channels, that corresponds to the particular content stream, wherein identifying the particular logical bearer channel includes identifying, based on the mapping, that a bearer channel identifier, associated with the particular logical bearer channel, is associated with the content stream identifier associated with the selected content stream;
   extracting, by the user device, a transport layer session from the identified particular logical bearer channel;
   providing, from a transport layer of the user device and to an application layer of the user device, the particular content stream from the transport layer session;
   decoding the particular content stream based on a particular codec associated with the particular content stream; and
   presenting, by the user device, the particular content stream, wherein presenting the video stream includes presenting the decoded particular content stream.

2. The method of claim 1, wherein the plurality of content streams are associated with a plurality of different digital rights management ("DRM") techniques, wherein the method further comprises:
   verifying the particular content stream based on a particular DRM technique associated with the particular content stream, and
   wherein presenting the video stream includes presenting the verified particular content stream.

3. The method of claim 1, wherein the transport layer sessions include a plurality of File Delivery over Unidirectional Transport ("FLUTE") sessions.

4. The method of claim 1, wherein the transport bearer channel includes a Long Term Evolution ("LTE") Multicast Channel ("MCH").

5. The method of claim 1, wherein the logical bearer channels include a plurality of LTE Multicast Traffic Channels ("MTCHs").

6. The method of claim 1, wherein the logical bearer channels are included in the transport bearer channel in a time-division multiplexed manner.

7. A user device, comprising:
   a non-transitory memory device storing a set of computer-executable instructions; and
   a processor configured to execute the set of computer-executable instructions, wherein executing the set of computer-executable instructions causes the processor to:
      identify a received transport bearer channel, via which a plurality of content streams are received, the plurality of content streams being associated with a plurality of different codecs, the transport bearer channel including a plurality of logical bearer channels that each correspond to a particular transport layer session, each transport layer session corresponding to a particular one of the content streams;
      receive a selection of a particular content stream, of the plurality of content streams;
      receive a mapping of content stream identifiers to logical bearer channel identifiers;
      identify a content stream identifier associated with the selected particular content stream;
      identify a plurality of logical bearer channel identifiers associated with the plurality of logical bearer channels;
      identify a particular logical bearer channel, of the plurality of bearer channels, that corresponds to the particular content stream, wherein identifying the particular logical bearer channel includes identifying, based on the mapping, that a bearer channel identifier, associated with the particular logical bearer channel, is associated with the content stream identifier associated with the selected content stream;
      extract a transport layer session from the identified particular logical bearer channel;
      provide, from a transport layer of the user device and to an application layer of the user device, the particular content stream from the transport layer session;
      decode the particular content stream based on a particular codec associated with the particular content stream; and
      present the particular content stream, wherein presenting the video stream includes presenting the decoded particular content stream.

8. The user device of claim 7, wherein the plurality of content streams are associated with a plurality of different digital rights management ("DRM") techniques, wherein executing the processor-executable instructions further causes the processor to:

verify the particular content stream based on a particular DRM technique associated with the particular content stream, and wherein presenting the video stream includes presenting the verified particular content stream.

9. The user device of claim 7, wherein the transport layer sessions include a plurality of File Delivery over Unidirectional Transport ("FLUTE") sessions.

10. The user device of claim 7, wherein the transport bearer channel includes a Long Term Evolution ("LTE") Multicast Channel ("MCH").

11. The user device of claim 10, wherein the logical bearer channels include a plurality of LTE Multicast Traffic Channels ("MTCHs").

12. The user device of claim 7, wherein the logical bearer channels are included in the transport bearer channel in a time-division multiplexed manner.

13. A method, comprising:
receiving, by a server device, an indication of a quantity of content streams that are to be outputted to one or more user devices;
establishing, by the server device, a set of transport layer sessions that each correspond to a particular content stream, of the plurality of content streams, wherein the plurality of content streams are associated with a plurality of different codecs;
outputting, by the server device, the content streams to a base station via the transport layer sessions;
establishing, by the base station, a set of logical bearer channels that each correspond to a particular transport layer session, of the set of transport layer sessions;
outputting, by the base station and to the one or more user devices, the set of logical bearer channels via a single transport bearer channel; and
outputting, by the server device and to the one or more user devices, a mapping of content stream identifiers to logical bearer channel identifiers,
wherein the mapping allows a particular user device, of the one or more user devices, to identify, based on the mapping, that a bearer channel identifier, associated with particular logical bearer channel of the set of logical bearer channels, is associated with a content stream identifier associated with a particular content stream that has been selected by a user of the user device,
wherein the particular user device further decodes the particular content stream based on a particular codec associated with the particular content stream and presents the decoded particular content stream.

14. The method of claim 13, wherein the set of transport layer sessions includes a set of File Delivery over Unidirectional Transport ("FLUTE") sessions.

15. The method of claim 13, wherein the transport bearer channel includes a Long Term Evolution ("LTE") Multicast Channel ("MCH").

16. The method of claim 13, wherein the set of logical bearer channels includes a set of LTE Multicast Traffic Channels ("MTCHs").

17. The method of claim 13, wherein the logical bearer channels are included in the single transport bearer channel in a time-division multiplexed manner.

18. The method of claim 13, wherein the plurality of content streams are associated with a plurality of different digital rights management ("DRM") techniques.

19. The method of claim 18, wherein the user device further verifies the particular content stream based on a particular DRM technique associated with the particular content stream, and presents the verified particular content stream.

20. The method of claim 13, wherein outputting, the set of logical bearer channels via a single transport bearer channel includes broadcasting the set of logical bearer channels, via the single transport bearer channel, to the one or more user devices.

* * * * *